United States Patent

Knight

[11] Patent Number: 6,164,559
[45] Date of Patent: Dec. 26, 2000

[54] AGRICULTURAL CROP SPRAYING APPARATUS

[76] Inventor: Brian George Knight, Wireless Hill, S. Luffenham, Oakham, Rutland, Leics, United Kingdom, LE158NF

[21] Appl. No.: 09/331,220

[22] PCT Filed: Jan. 5, 1998

[86] PCT No.: PCT/GB98/00013

§ 371 Date: Jun. 17, 1999

§ 102(e) Date: Jun. 17, 1999

[87] PCT Pub. No.: WO98/30087

PCT Pub. Date: Jul. 16, 1998

[30] Foreign Application Priority Data

Jan. 13, 1997 [GB] United Kingdom .................. 9700571

[51] Int. Cl.⁷ ..................................................... B05B 1/20
[52] U.S. Cl. ......................... 239/167; 239/166; 239/288.3
[58] Field of Search ..................................... 239/159, 164, 239/166, 167, 172, 176, 288, 288.3

[56] References Cited

U.S. PATENT DOCUMENTS

| | | | |
|---|---|---|---|
| 2,614,884 | 10/1952 | Essick | 299/40 |
| 2,659,624 | 11/1953 | Harz | 239/288.3 X |
| 3,284,006 | 11/1966 | Cartwright | 239/166 |
| 4,353,505 | 10/1982 | Kinder | 239/167 |
| 4,379,522 | 4/1983 | Elliott et al. | 239/167 |
| 4,646,971 | 3/1987 | Rogers | 239/166 |
| 4,711,398 | 12/1987 | Ganderton et al. | 239/167 |
| 4,834,249 | 5/1989 | Dahl | 212/266 |
| 4,946,102 | 8/1990 | DeWitt et al. | 239/167 |
| 6,042,020 | 3/2000 | Weddle | 239/167 X |

FOREIGN PATENT DOCUMENTS

| | | | |
|---|---|---|---|
| 2 298 264 | 8/1976 | France . | |
| 3639130 | 5/1988 | Germany | 239/167 |

*Primary Examiner*—Andres Kashnikow
*Assistant Examiner*—Steven J. Ganey
*Attorney, Agent, or Firm*—Townsend and Townsend and Crew LLP

[57] ABSTRACT

Agricultural crop spraying apparatus comprising a spray boom made from a space-frame of members comprising laterally and vertically spaced longitudinally extending members joined at intervals by traverse cross-members, with the spray nozzles disposed within the boom framework for protection characterized in that the cross-members of the spray boom frame are positioned above the lowest extremity of the boom framework to allow the spray nozzles to be disposed below the cross-members while still positioning the nozzles within the boom and to allow uninterrupted longitudinal positioning of the spray nozzles. Preferably, the cross-section of the boom is substantially triangular so that the sections of the folded boom arms interfit one with the other. Hinges joining the section of the boom preferably have inclined pivot axes such that the height reached by the boom extremities during folding is less than the arms pivot vertically.

7 Claims, 2 Drawing Sheets

AGRICULTURAL CROP SPRAYING APPARATUS

TECHNICAL FIELD

The invention relates to agricultural crop spraying apparatus.

BACKGROUND TO THE INVENTION

It is common practice to apply chemicals to a growing crop, for instance to help control pests, fungi or weeds.

Ground-based crop-spraying equipment commonly comprises a vehicle, e.g. tractor, carried body having an elongate framework or boom which extends laterally from the body and which supports nozzles which apply a spray mist of chemical/water mixture to the crop and its surroundings. Such a boom is often used to cover a working width of between 12 and 30 meters to minimise the number of passes required to cover a given area of land.

Spray booms are conventionally made from a space-frame of members, e.g. tubes, comprising laterally and vertically spaced longitudinally extending members joined at intervals by transverse cross-members, with the spray nozzles disposed within the boom framework for protection. It is not possible with such conventional spray booms to place the spray nozzles in any desired location along the boom since the cross members occupy positions at which it may be wished to place the spray nozzles.

Conventionally, the opposed arms of the spray boom each comprise at least two sections which are folded over against themselves and are then positioned against the sides of sprayer, e.g. tractor, for road transport/storage. Thus, where the hinge axes are vertical, the lateral width of the sprayer may be increased by several times the width of the spray boom during such road transportation and storage. It is important in some circumstances, e.g. when the sprayer is already wide, that the folded arms of the boom do not unduly increase lateral width of sprayer. Another way of folding the boom for storage and transportation involves hinging the boom sections about horizontal axes, but while this mitigates the problem of the folded width of the spray boom, it introduces instead the problem that during such folding of the arms of the boom, there is a risk of contact with overhead obstructions, e.g. power lines, due to movement of the arms through vertical arcs and due to the considerable length of the boom and its respective arm sections.

It is an object of the invention to mitigate these problems.

DISCLOSURE OF THE INVENTION

From one aspect of the invention, the cross members of a spray boom frame are positioned above the lowest extremity of the boom framework to allow the spray nozzles to be disposed below the cross members while still positioning the nozzles within the boom, to allow uninterrupted longitudinal positioning of the spray nozzles.

According to another aspect of the invention, these problems are mitigated by shaping the cross-section of the boom to be substantially triangular (instead of rectangular as is conventional) so that the sections of the folded boom arms interfit one with the other to occupy less space laterally. Also such shaping permits angling the pivots of the boom arm sections away from the horizontal so that pivot axes are inclined such that the height reached by the boom extremities during folding is less than if the arms pivot vertically.

From yet another aspect, the invention is a combination of a spray boom as described above which permits the uninterrupted positioning of the nozzles along the boom, and a boom of substantially triangular cross-section as described above.

The cross-section of the framework of the boom may comprise a generally vertical front portion which extends below the triangular portion to form a guard for the spray nozzles. This arrangement allows space for revolving, i.e. indexable, spray nozzles to be fitted and which can be revolved or indexed without removal from the boom.

Preferably the lower extremity of the front portion forms a guard rail for the spray nozzles which is a structural part of the boom framework.

BRIEF DESCRIPTION OF DRAWINGS

The invention is diagrammatically illustrated, by way of example, in the accompanying drawings in which:FIG.

BEST MODE FOR CARRYING OUT THE INVENTION

Figure 1:
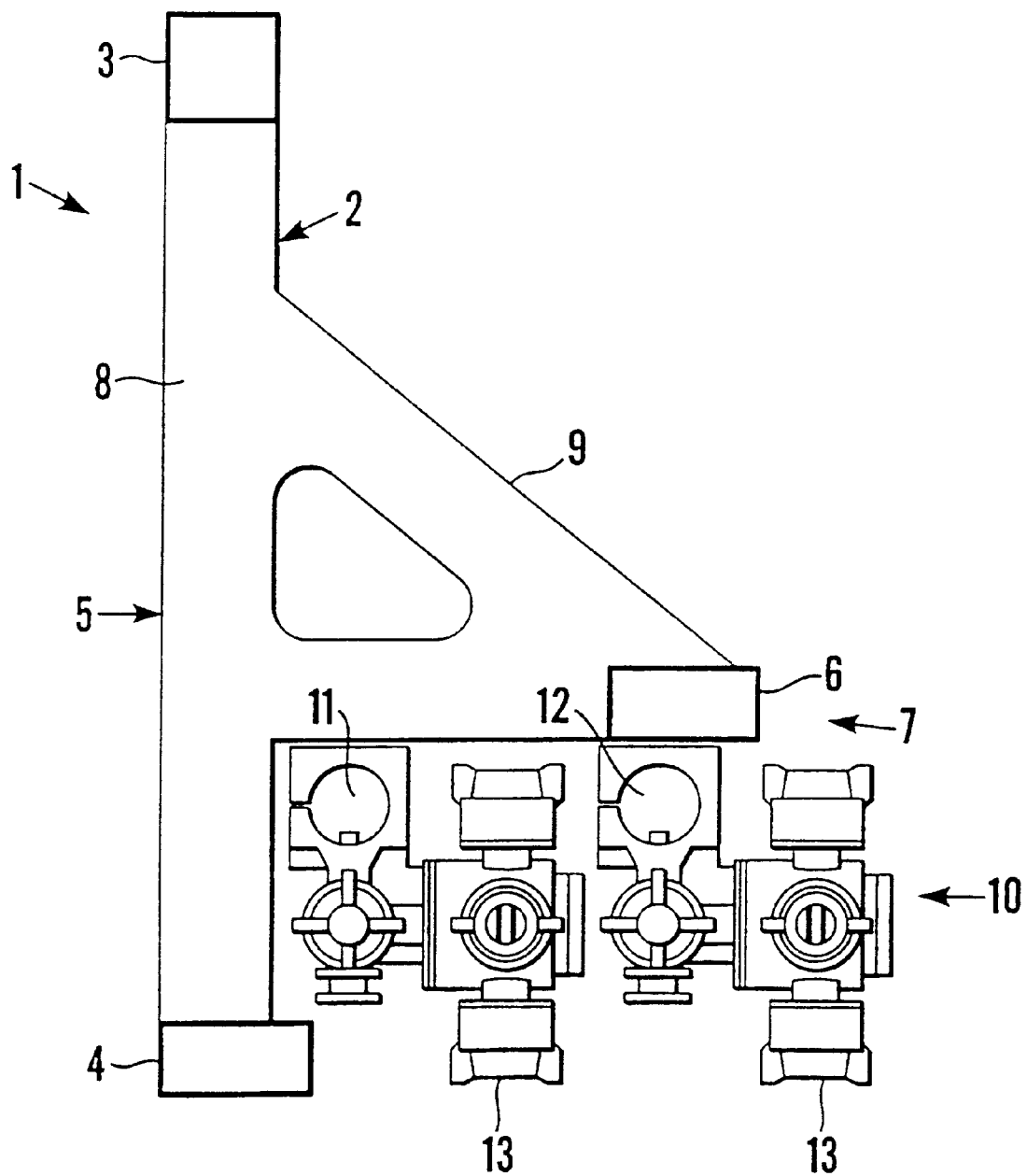
FIG. 1 is a vertical cross-section of a spray boom.

In the drawings there is shown a spray boom for an agricultural crop spraying apparatus of the kind which is normally supported on a wheeled vehicle such as a tractor and which is adapted during use to extend horizontally and laterally from the tractor. The spray boom supports a spray liquid distribution system terminated by a series of spray nozzles which apply a spray mist of the spray liquid to a crop to be treated. Such a spray apparatus usually comprises an opposed pair of booms extending laterally from opposite sides of the tractor and each boom usually comprises a plurality of boom sections which are hinged together whereby the boom can be folded for storage and for transportation to lie against the tractor sides to reduce the width of the spray apparatus to a minimum. Since, in general, such apparatus is well known per se, the spray apparatus as a whole is not shown in the drawings. Instead the drawings show the novel configuration of the boom in cross-sectional end elevation.

As shown in the drawings, a spray boom (1) comprises sections (2) each of which is formed from a space frame comprising a pair of generally horizontal upper and lower vertically superposed longitudinally extending frame members (3,4 respectively), e.g. of rectangular or square section steel tube and which together define the front (5) of the boom section, and a generally horizontal longitudinally extending frame member (6) also of square or rectangular section steel tube positioned laterally to one side of the said pair of frame members (3,4) and vertically between the pair of frame members to define the rear (7) of the boom section. Generally vertical cross members (8) extend transversely to join the pair of frame members at intervals along the length of the boom sections and the cross members carry rearwardly extending triangular brackets (9) intermediate their ends and which connect to the rear frame member (6) to unite the frame structure of the boom sections.

The above described frame structure defines a clear space (10) unobstructed by frame cross members below the triangular brackets (9) of the cross members (8) and behind the lower front portion of the boom and extending along the boom sections in which spray liquid nozzles (13) can be installed so that the nozzles are protected by the front of the boom since the lower frame member (4) forms a guard As shown, the arrangement comprises a pair of spray lines (11,12) mounted on the underside of the brackets (9) and pairs of spray nozzles (13) associated with the respective lines (11,12). The nozzles are shown to be of the indexable variety, i.e. adapted for rotation about a horizontal axis to bring a desired one of several spray nozzles into the operative lower position.

The arrangement is therefore such that there is no obstruction to the positioning of the spray nozzles along the boom in any desired location, unlike existing spray booms in which cross members of the boom framework prevent such adjustment.

Figure 2:
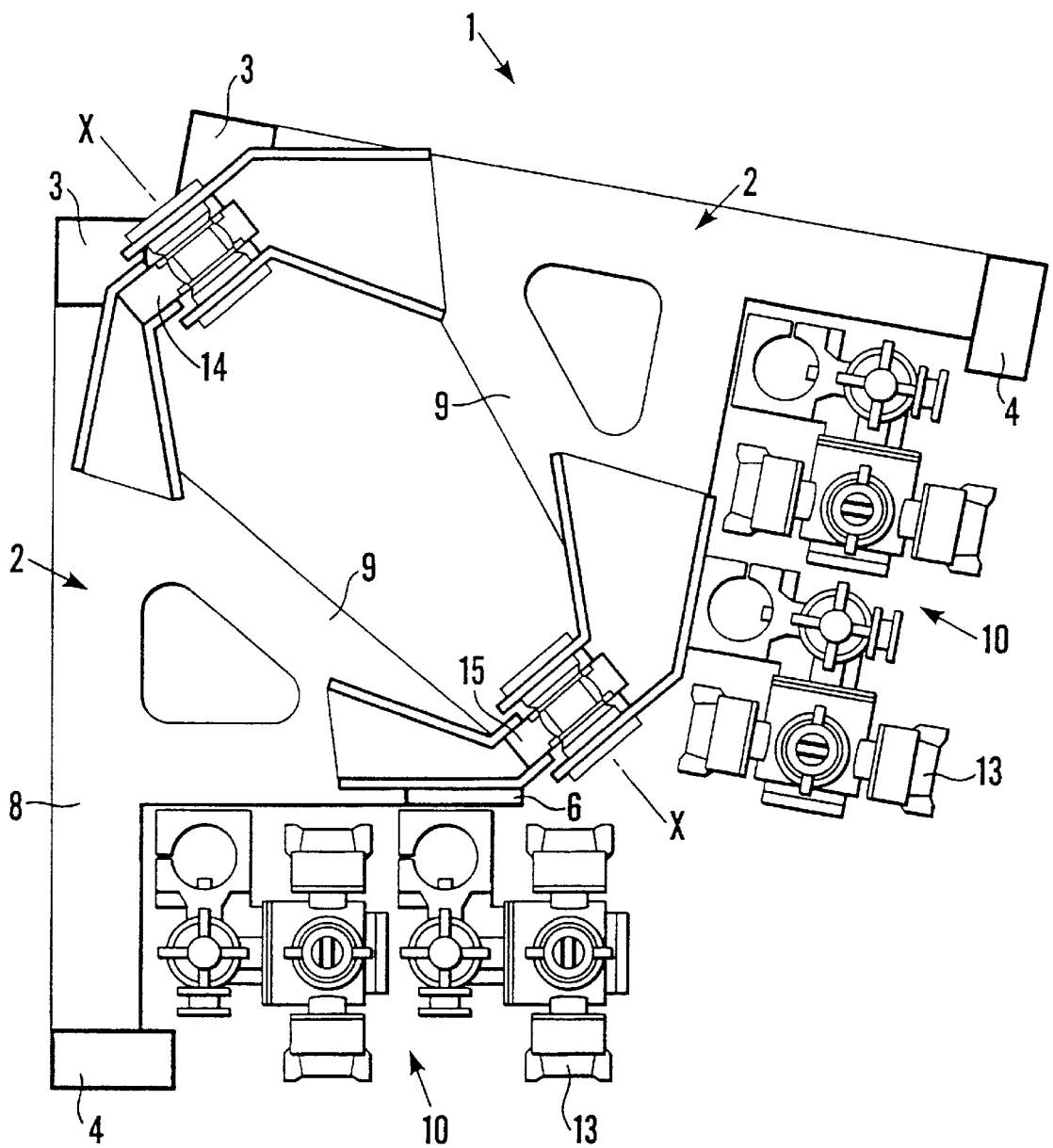
FIG. 2 is a vertical cross-section of the spray boom of FIG. 1 and showing how spray boom sections are hinged together.

FIG. 2 shows that the novel boom configuration facilitates the hinging of the various boom sections together about an inclined axis shown by broken line X—X, the generally triangular boom shape being such that the boom sections occupy a minimum of space when folded together as shown. Also the inclined pivot axis will mean that the vertical height of the boom sections during folding and unfolding of the boom is minimised in the interests of safety. As shown, the respective members of a pair of hinges (14,15) can be attached to the boom adjacent to the upper member (3) of the frame and to the rear frame member (6) respectively.

INDUSTRIAL APPLICABILITY

The embodiment of the invention described above thus provides a novel construction of spray boom for an agricultural sprayer having the advantages of (1) permitting unobstructed positioning of the spray nozzles along the boom while shielding the nozzles behind the front of the spray boom, (2) compact storage when folded and (3) reduced vertical height during folding/unfolding of the boom.

What is claimed is:

1. Agricultural crop spraying apparatus comprising a spray boom made from a space-frame of members comprising laterally and vertically spaced longitudinally extending members joined at intervals by transverse cross-members, with at least one longitudinally extending member defining a lowest extremity of the space-frame of members; and spray nozzles disposed within the space-frame of members for protection, wherein the transverse cross-members of the space-frame of members are positioned above the lowest extremity of the space-frame of members to allow the spray nozzles to be disposed below the transverse cross-members while still positioning the spray nozzles within the space-frame of members to allow uninterrupted longitudinal positioning of the spray nozzles.

2. Agricultural crop spraying apparatus according to claim 1, wherein the spray boom comprises a plurality of boom sections which are hinged together whereby the spray boom can be folded for storage and transportation, and wherein each boom section has a substantially triangular cross-section so that the boom sections of the spray boom interfit compactly one with another when folded.

3. Agricultural crop spraying apparatus according to claim 2, characterized by hinges joining the boom sections, which hinges have pivot axes inclined from the vertical such that heights reached by extremities of the spray boom during folding is reduced.

4. Agricultural crop spraying apparatus as claimed in claim 1, wherein the spray boom comprises a front portion which extends below the at least one longitudinally extending member defining the lowest extremity of the space-frame of members to form a guard for the spray nozzles.

5. Agricultural crop spraying apparatus according to claim 4, wherein the front portion forming the guard is a structural part of the spray boom.

6. Agricultural crop spraying apparatus according to claim 1, wherein the space-frame of members forming the spray boom comprises three longitudinally extending frame members arranged in a triangular array and connected together at intervals along their lengths by the transverse cross-members; each transverse cross-member comprising a vertical member extending between an upper and lower pair of the longitudinally extending frame members forming a front part of the spray boom and having a bracket projecting laterally therefrom at a position between the upper and lower pair of the longitudinally extending frame members and connected to a third one of the longitudinally extending fame members forming a rear part of the spray boom, the front part and rear part being spaced apart to define a clear space below each bracket for receiving one of the spray nozzles.

7. Agricultural crop spraying apparatus according to claim 6, wherein hinge pins are secured adjacent to the upper longitudinally extending frame member and adjacent to the third one of the longitudinally extending frame members.

* * * * *